Figure 10A:
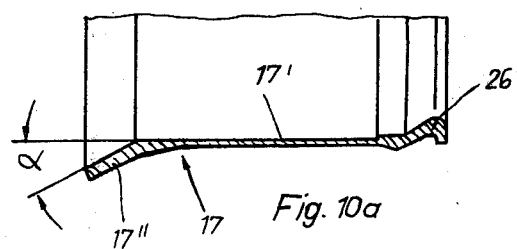

United States Patent [19]

Bosch

[11] 4,127,022
[45] Nov. 28, 1978

[54] METHOD OF MANUFACTURING SOLID WHEEL RIMS

[75] Inventor: Walter Bosch, Ostfildern, Germany

[73] Assignee: Bohner & Kohle GmbH & Co., Germany

[21] Appl. No.: 802,452

[22] Filed: Jun. 1, 1977

[30] Foreign Application Priority Data

Jun. 3, 1976 [DE] Fed. Rep. of Germany ....... 2624873

[51] Int. Cl.$^2$ .............................................. B21D 53/30
[52] U.S. Cl. ..................................... 72/367; 29/159.1; 113/116 D
[58] Field of Search ................... 72/68, 367; 29/159.1, 29/159.01; 113/116 D, 116 E; 301/10 R, 96

[56] References Cited

U.S. PATENT DOCUMENTS

| 3,846,886 | 11/1974 | Schroder et al. | 29/159.1 |
| 4,050,135 | 9/1977 | Luedi | 29/159.1 |

FOREIGN PATENT DOCUMENTS 1,348,893  3/1974  United Kingdom ..................... 29/159.1

*Primary Examiner*—Lowell A. Larson
*Attorney, Agent, or Firm*—Watson, Cole, Grindle & Watson

[57] ABSTRACT

A method of manufacturing a solid wheel rim having a wheel-rim flange at one end of a wheel-rim base and a spring-ring groove at an opposite end of the base, from a rolled and longitudinally welded sheet metal ring of a predetermined inner diameter having a reduced wall thickness over at least a part of its length, includes the expansion of a portion of the ring to produce an annular groove zone having an inner diameter equal to the predetermined inner diameter, an enlarged zone having an inner diameter greater than such predetermined diameter, and a tapered zone located between the annular groove and enlarged zones, the wall thickness of the ring being reduced during a pressing operation, and forming the spring-ring groove and the wheel-rim flange upon application of pressure. The pressing operation and the applications of pressure may constitute a single working operation, or may be carried out by using first, second and third presses, respectively.

7 Claims, 13 Drawing Figures

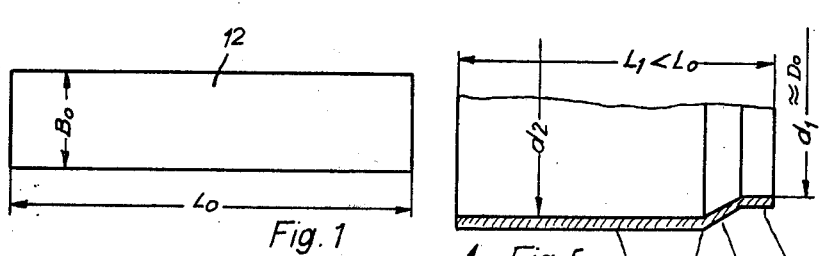
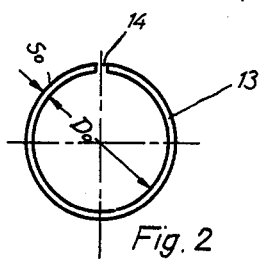
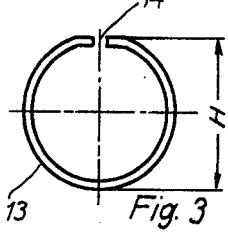
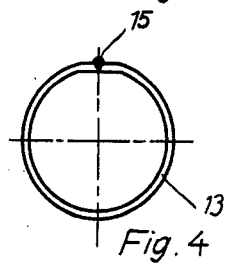
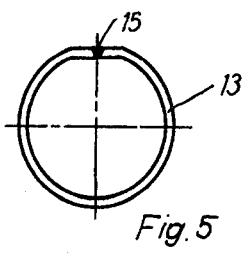
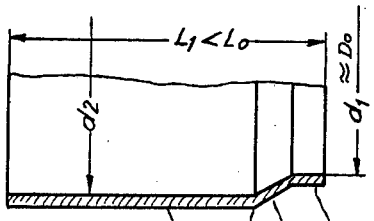
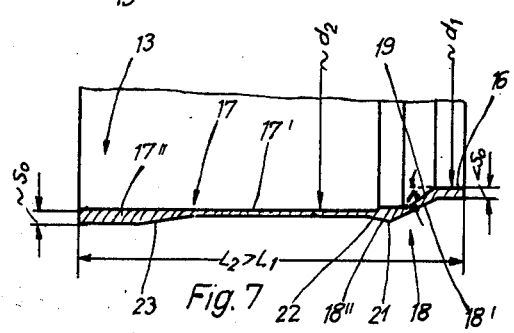
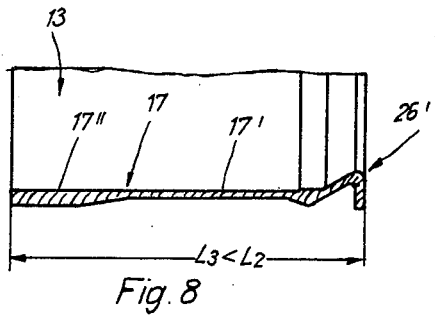
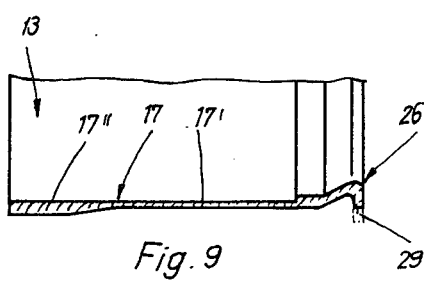

METHOD OF MANUFACTURING SOLID WHEEL RIMS

The invention relates to a method of manufacturing solid wheel rims, for example for trucks or lorries, with a wheel flange at one side of the wheel rim base and a spring ring groove at the other side, from a rolled (rounded) and longitudinally welded sheet metal ring which is shaped to the respective section shape and the wall thickness of which is reduced over at least part of its length.

In a known method of this kind (German Federal Republic Offenlegungsschrift 2343247) the spring ring groove is first of all impressed at one end of the sheet metal ring, the sheet metal ring is then shaped in determined zones from the spring ring groove towards the flange end and then stretched to its desired wall thickness and thereafter the other end is opened out to form the flange. The stretching takes place therewith through two rolling surpluses, the wheel rim base being extended in the second surplus. This known method is relatively complicated on the one hand having regard to its separate operations or procedures, as the extension of the wheel-rim base and the formation of a recess for the spring ring have to take place in separate operations, and on the other hand is relatively expensive having regard to the tools employed. Over and above that there is also not attained at least in the zone of the spring ring groove the optimum varying wall thickness which is in comformity with the incident loads, as the spring ring groove is formed before the extension is effected. Thus, too much unneccessary material is always accumulated. Moreover after the known method the outer edging must subsequently be calibrated and the radii between the wheel rim base and on the one hand the annular groove, and on the other hand the flange, have to be smoothed.

An object of the present invention is to provide a method of the initially-mentioned kind in which there is obtained over the whole profile of the wheel rim a varying wall thickness precisely conforming in all points and zones to the required cross-section, and which can be conducted simply and with cheaper tools.

In attaining this objective provision is made according to the invention for the rolled and longitudinally-welded sheet-metal ring to be partially enlarged during the rounding operation by variable expanding, for this enlarged zone together with the annular groove end and an inclined zone located therebetween to be then reduced in wall thickness by hydraulic pressure or application of pressure, for the annular groove outer end to be pressed through about 90° and for the sheet-metal ring then to be bent outwardly flat acute-angled at its flange end and to be shaped to a rounded flange.

In this way there is produced a relatively simple method of manufacturing solid wheel rims, in which, by hydraulically pressing the enlarged sheet metal ring at each zone of the later flange, of the wheel-rim base and of the annular groove, precisely these wall thicknesses and that transition between two different wall thicknesses can be achieved which conforms to the later loading in the working condition. This effects a saving in material and makes possible an increase in strength and rigidity of the wheel-rim surface in specific zones. It is possible with this procedural step to stretch those zones at which little material is repuired, and to put or displace this material into those zones at which much material is required. This can be reproduced with a very high degree of accuracy. The simplicity of this procedural step is a result of the possibility of pressing in one working operation also the conical transition to the later wheel-rim flange together with the reduction in wall thickness. A further advantage consists in that the likewise necessary rounding of the sheet-metal ring after its longitudinal welding is used at the same time for the purpose of expanding the ring in such a way that the later wheel-rim base and zone of the later flange receives a greater diameter relative to the annular groove, there being formed between these two different diameters a conical zone which later forms the transition from the annular groove to the wheel-rim base. After these two essential procedural steps which make possible a wall thickness adaptation to optimum requirements and compensation for tolerances in the starting material by the axial displacement of the material and hence simple trimming operations and a constant contour yield in the critical zones, there takes place the further pressing operations which with simple tools and simpler types of machines achieve an economic improvement in the hydraulic pressure profiling. A further advantage consists in that, in the method according to the invention, subsequent smoothing in the rounded zones between the wheel-rim base and both the annular groove and the flange is not necessary, since the smoothing effect is attained on pressing of the annular groove and the flange.

In an embodiment of the present invention the inclined wall zone extending between the annular groove and the wheel-rim base is pressed to a cone the inner surface of which subtends an angle $\gamma$ of 28° with the axis of rotation. This is essential for the centering on mounting the wheel rim on the wheel spider.

In order to achieve an improved loading of the wheel-rim, the flange end is preformed by first of all being bent off at an angle smaller than that at which it is finally bent.

In further embodiments of the invention, the wall thickness reduction and also all other procedural steps take place in one press or a plurality of presses.

Further details and refinements of the invention will become apparent from the following description, in which a method of manufacturing solid wheel rims from a sheet-metal strip is more particularly described and explained with reference to the diagrammatic FIGS. 1 to 11, FIGS. 1 to 5 being elevational views and FIGS. 6 to 11 being longitudinal sectional views of a wheel rim at different stages of the manufacture thereof.

In the method according to the invention of manufacturing a solid wheel rim 11, preferably for trucks or lorries, from a sheet-metal strip 12, the latter according to FIGS. 1 to 5 is first of all cut to a specific length Lo and width Bo from sheet material having a thickness So, shaped by rolls into a cylindrical ring (rounded) with a specific inner diameter Do, and provided at a height H with a flattening in the area 14 of the abutment; the abutment area 14 of the rolled (rounded) ring is then longitudinally welded and line 15 of weld subsequently smoothed. This now closed ring is then again rounded.

During the rounding operation the sheet-metal ring 13 is reamed up as shown in FIG. 6, in such a manner that a zone 16 of an annular groove to be subsequently formed has an inner diameter $d$, substantially equal to inner diameter Do of the sheet-metal ring 13, whereas a remaining zone 17, which later forms the base of the wheel rim and the wheel rim flange, is reamed up to a larger inner diameter $d_2$, a conically-inclined zone 18 being formed between these two co-axial zones 16 and 17. The expanded sheet-metal ring 13 thereby still has over its full axial length the same wall thickness So as the original sheet 12 had. The two diameters of the regions 16 and 17 may besides, if necessary, be exactly calibrated.

The variation in wall thickness of the sheet-metal ring 13 is now made as shown in FIG. 7 on a first press precisely to the operational and strength requirements. This wall thickness, varying differently in the axial direction, is produced in one working operation starting from the zone 16 at the annular groove end. Whereas the zone 16 is made only slightly thinner and retains a constant thickness over its length, a tapered shape is impressed at the conical zone 18, in such a way that the course from the inner side 19 relative to the outer side is initially conical and is then concentric in the zone of the external bend 21 between the zones 18 and 17, so that in this zone 18" there is a considerable accumulation of material. This also yields a reduction in the material stress between the zone sections 18' and 18" of the conical zone 18; associated therewith is a stiffening of the surface. The above-described surface and wall thickness development is not an absolute necessity. Departures from this can be made according to the structural conditions at any given time, e.g., when deviations from the stress are necessary. The inner surface 19 of the inclined zone 18', pressed into a conical shape in thickness, forms an angle $\gamma$ of 28° with the axis of rotation of the wheel rim. The zone section 18' passes internally over into the zone 17' and externally by way of a conical surface 22 into the zone 17'. The zone section 17', which later forms the base of the wheel rim, receives a wall thickness substantially reduced relative to that of the original wall thickness and passes by way of a relatively shallow conical surface 23 into the zone section 17" which has about the original wall thickness So and later forms the wheel flange. The conical surface 23 is moreover arranged in such a way that it ends within the later bend to the flange. The zone section 17" may if necessary also be of varying wall thickness. The reduction in wall thickness in the entire zone 17 is brought about by means of hydraulic pressures from the annular groove side to the flange side, whereby a precisely determinable wall thickness development is possible and whereby the sheet-metal ring 13 is stretched to a greater length $L_2$.

After the procedural step to produce the wall thickness development adapted to the operation requirements going from the annular groove side to the region of the wheel rim base, pressure is applied at zone 16 to form the annular groove 26. With that the forming of this side of the finally formed wheel rim 11 is finished (FIG. 8). If necessary the radial edge 29 of the annular groove 26 may be trimmed as shown in FIG. 9.

Figure 10B:
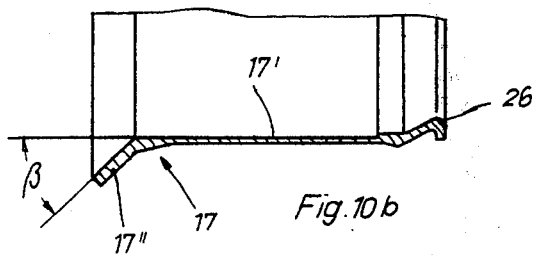
Figure 10C:
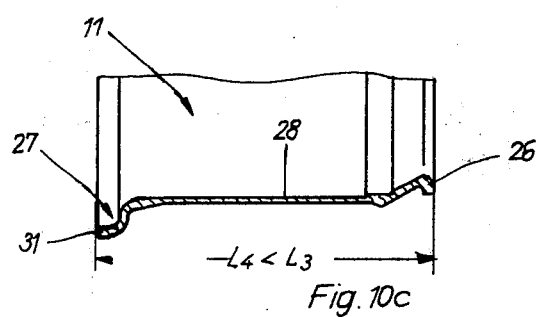

As shown in FIGS. 10a to 10c the shaping of the zone section 17" to form the wheel rim flange 27 is effected in three steps, which may, however, be undertaken with a single setting on one and the same press. Firstly the zone section 17" is expanded conically outwardly and thus preformed having an angle $\alpha$. This conical expansion is followed by a further expansion in the same direction, so that there is formed a cone with the angle of slope b. Thereafter the conical zone section 17" is rounded into a somewhat S-shape and with that transformed to the final wheel rim flange 27. The wheel rim base 28 is formed at the same time between the wheel rim flange 27 and the annular groove 26. Both the rounded inner surface zone of the wheel rim flange 27 and the rounded outer surface zone of the annular groove 26 have automatically been smoothed by the aforementioned procedural steps.

Figure 11:
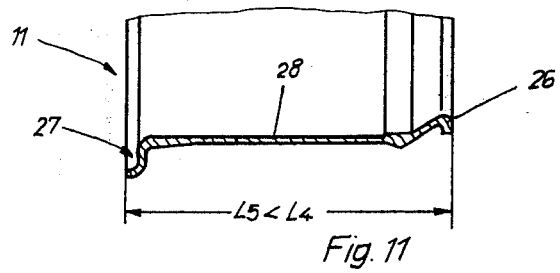

As shown in FIG. 11 the axial edge 31 of the wheel rim flange 27 can also be trimmed, if necessary, in order that the wheel rim 11 be reduced to its final axial dimension $L_5$.

One and the same machine — a special machine developed by applicant may employed for the above-described pressure and hydraulic pressure operations, especially if manufacture has to be in small quantities with low financial expenditure, e.g., on manufacture in or delivery to developing countries. A separate machine, suitable in each case to the pertaining working step, is employed for each working step, when large quantities are involved, in order that efficient manufacture and a good flow of material are obtained, a production line possibly being set up with this.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of manufacturing a solid wheel rim, for example for trucks or lorries, having a wheel-rim flange at one end of a wheel-rim base and a spring-ring groove at an opposite end of the base, from a rolled and longitudinally welded sheet-metal ring of a predetermined inner diameter shaped to a predetermined section shape and having a reduced wall thickness over at least part of its length, comprising the steps of radially expanding a portion of said ring during a rounding operation to produce an annular groove zone having an inner diameter substantially equal to said predetermined inner diameter, an enlarged zone having an inner diameter greater than said predetermined inner diameter, and a tapered zone located between said annular groove and enlarged zones, reducing the wall thickness of said ring during a pressing operation by subjecting each of said zones to a predetermined pressure, outwardly bending said ring at said annular groove zone through about 90° upon application of pressure to form said spring-ring groove, outwardly bending said ring at said one end upon application of pressure to form a conical zone having flat inner and outer surfaces, and shaping said ring at said conical zone upon application of pressure to form a rounded wheel-rim flange.

2. The method according to claim 1, wherein said ring is pressed to form a tapered wall thickness at said tapered zone for increasing said wall thickness at a bend between said enlarged and said tapered zones, thereby resulting in an increase in strength and rigidity at said bend.

3. The method according to claim 1, wherein said ring is pressed into conical shape at said tapered zone, an inner surface of which subtends an angle of about 28° with a central axis of rotation of said ring.

4. The method according to claim 1, wherein said ring is hydraulically pressed at said enlarged zone to form shallow conical surfaces with said wheel-rim flange and with said tapered zone.

5. The method according to claim 1, wherein said bending step forming said conical zone includes the sub-steps of first bending to form said inner surfaces as subtending a predetermined angle with a central axis of rotation of said ring, and further bending to form said inner surface as subtending an angle, with said axis, greater than said predetermined angle.

6. The method according to claim 1, wherein said pressing operation and the application of pressure constitute a single working operation.

7. The method according to claim 1, wherein said reducing step and said steps forming said spring-ring groove and said wheel-rim flange are carried out by using first, second and third presses, respectively.

* * * * *